(12) United States Patent
Kelly

(10) Patent No.: US 10,106,159 B2
(45) Date of Patent: Oct. 23, 2018

(54) VEHICLE CONTROLLER AND METHOD

(71) Applicant: Jaguar Land Rover Limited, Whitley Coventry Warwickshire (GB)

(72) Inventor: James Kelly, Solihull (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 123 days.

(21) Appl. No.: 14/910,691

(22) PCT Filed: Jul. 24, 2014

(86) PCT No.: PCT/EP2014/065911
§ 371 (c)(1),
(2) Date: Feb. 6, 2016

(87) PCT Pub. No.: WO2015/018652
PCT Pub. Date: Feb. 12, 2015

(65) Prior Publication Data
US 2016/0194002 A1   Jul. 7, 2016

(30) Foreign Application Priority Data

Aug. 7, 2013 (GB) .................................. 1314155.1

(51) Int. Cl.
*B60K 31/00* (2006.01)
*B60T 8/00* (2006.01)
*B60W 30/14* (2006.01)
*B60W 50/14* (2012.01)
(Continued)

(52) U.S. Cl.
CPC .......... *B60W 30/146* (2013.01); *B60W 10/06* (2013.01); *B60W 10/08* (2013.01);
(Continued)

(58) Field of Classification Search
None
See application file for complete search history.

(56) References Cited

U.S. PATENT DOCUMENTS

| 7,460,945 B2 | 12/2008 | Boecker et al. |
| 2004/0193354 A1 | 9/2004 | Dunoyer et al. |
| 2004/0215385 A1* | 10/2004 | Aizawa .................. B60K 31/00 701/93 |

FOREIGN PATENT DOCUMENTS

| DE | 102007029482 A1 | 1/2009 |
| DE | 102011116741 A1 | 4/2012 |

(Continued)

OTHER PUBLICATIONS

Combined Search and Examination Report corresponding to application No. GB1314155.1, dated Feb. 18, 2014, 8 pages.
(Continued)

*Primary Examiner* — Adam D Tissot
(74) *Attorney, Agent, or Firm* — Reising Ethington P.C.

(57) ABSTRACT

Embodiments of the present invention provide a method of communicating to a user information in respect of a change in activation state of a vehicle speed control system from an inactive state to an active state, the method being implemented by means of a controller, the active state being a state in which the speed control system is operable to control vehicle speed in accordance with a target speed at least in part by causing application of positive powertrain drive torque, the inactive state being a state in which the speed control system does not cause application of positive powertrain drive torque, comprising: causing a transient increase in a speed of a motor of the powertrain prior to the speed control system controlling vehicle speed in accordance with a target speed in the active state.

20 Claims, 6 Drawing Sheets

(51) Int. Cl.
  *B60W 10/06* (2006.01)
  *B60W 10/184* (2012.01)
  *B60W 10/08* (2006.01)
  *B60W 10/18* (2012.01)
  *B60W 50/00* (2006.01)

(52) U.S. Cl.
  CPC .......... *B60W 10/18* (2013.01); *B60W 10/184* (2013.01); *B60W 30/143* (2013.01); *B60W 50/14* (2013.01); *B60K 2310/244* (2013.01); *B60K 2310/248* (2013.01); *B60W 2050/0096* (2013.01); *B60W 2710/0644* (2013.01); *B60W 2710/182* (2013.01); *B60W 2720/10* (2013.01); *B60W 2720/103* (2013.01)

(56) References Cited

FOREIGN PATENT DOCUMENTS

| EP | 1442917 A2 | 8/2004 |
|---|---|---|
| JP | 2002089314 A | 3/2002 |
| WO | WO2004039622 A1 | 5/2004 |

OTHER PUBLICATIONS

International Search Report corresponding to International application No. PCT/EP2014/065911, dated Nov. 10, 2014, 5 pages.
International Search Report and Written Opinion corresponding to International application No. PCT/EP2014/065911, dated Nov. 10, 2014, 15 pages.

* cited by examiner

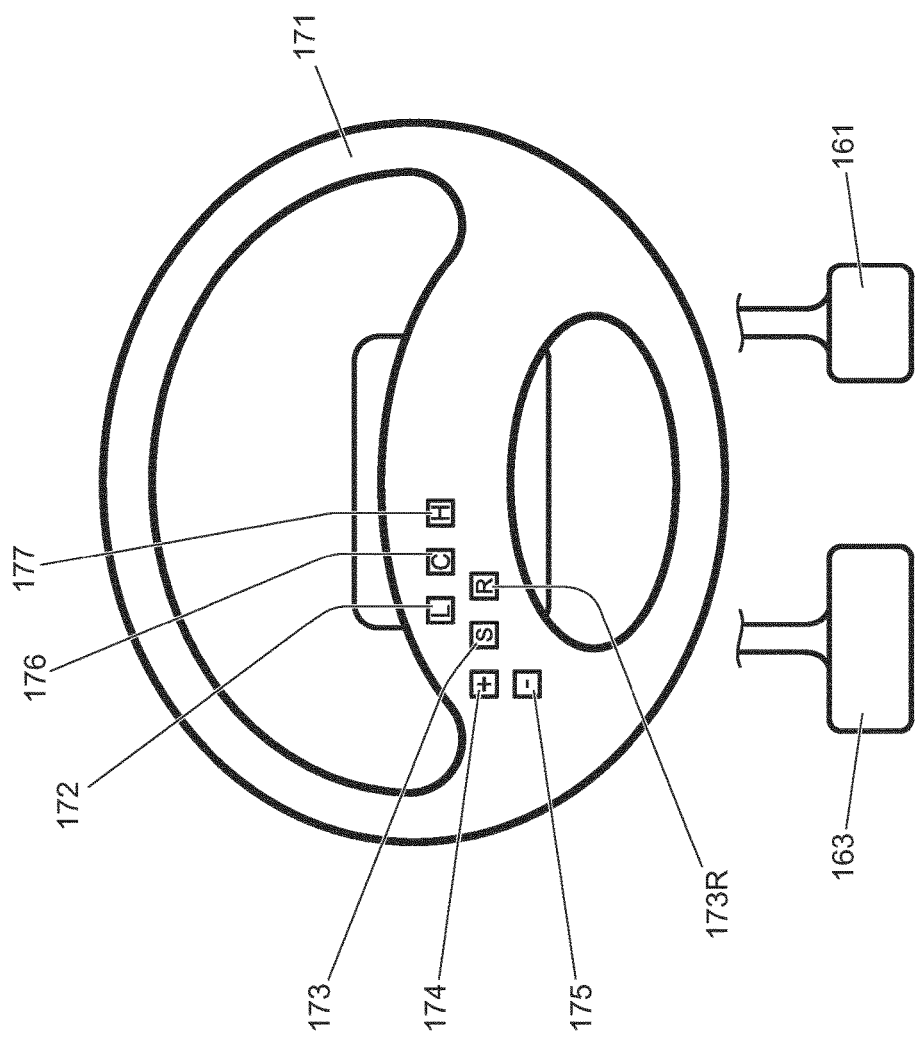

Step S101: vehicle 100 is travelling over terrain with LSP control system 12 'off'.

Step S103: Selector button 172 depressed; LSP control system 12 to 'standby'.

Step 105: Set button 173 depressed; LSP_set-speed set to instant vehicle speed.

Step S107: LSP control system 12 sets flag indicating 'active' mode selected.

Step S109: LSP control system 12 causes a transient increase in engine speed; net wheel torque maintained constant by braking as required.

Step S111: Has engine speed returned to the instant value at the moment set button 173 was pressed? N

Y

Step S113: LSP control system 12 to 'active'; commences causing the vehicle 100 to operate in accordance with the value of LSP_set-speed.

Step S115: Driver depresses brake pedal 163.

Step S117: LSP control system 12 assumes the standby condition.

FIGURE 6

VEHICLE CONTROLLER AND METHOD

FIELD OF THE INVENTION

This disclosure relates to a method of providing feedback to a user indicating that a vehicle system has been activated, and to a system operable to implement the method. In particular, but not exclusively, the disclosure relates to a system for providing feedback to a user that a system such as a speed control system is active whilst a vehicle is being driven off-road. Aspects of the invention relate to a system, to a method and to a vehicle.

The content of co-pending UK patent application no GB2507622 and U.S. Pat. No. 7,349,776 are hereby incorporated by reference.

BACKGROUND

In known vehicle speed control systems, typically referred to as cruise control systems, the vehicle speed is maintained on-road once set by the user without further intervention by the user so as to improve the driving experience for the user by reducing workload.

With typical cruise control systems, the user selects a speed at which the vehicle is to be maintained, and the vehicle is maintained at that speed for as long as the user does not apply a brake or, in the case of a vehicle having a manual transmission, depress a clutch pedal. The cruise control system takes its speed signal from a driveshaft speed sensor or wheel speed sensors. When the brake or the clutch is depressed, the cruise control system is disabled so that the user can override the cruise control system to change the vehicle speed without resistance from the system. If the user depresses the accelerator pedal the vehicle speed will increase, but once the user removes his foot from the accelerator pedal the vehicle reverts to the pre-set cruise speed by coasting.

Such systems are usually operable only above a certain speed, typically around 15-20 kph, and are ideal in circumstances in which the vehicle is travelling in steady traffic conditions, and particularly on highways or motorways. In congested traffic conditions, however, where vehicle speed tends to vary widely, cruise control systems are ineffective, and especially where the systems are inoperable because of a minimum speed requirement. A minimum speed requirement is often imposed on cruise control systems so as to reduce the likelihood of low speed collision, for example when parking. Such systems are therefore ineffective in certain driving conditions (e.g. low speed) and are set to be automatically disabled in circumstances in which a user may not consider it to be desirable to do so.

More sophisticated cruise control systems are integrated into the engine management system and may include an adaptive functionality which takes into account the distance to the vehicle in front using a radar-based system. For example, the vehicle may be provided with a forward-looking radar detection system so that the speed and distance of the vehicle in front is detected and a safe following speed and distance is maintained automatically without the need for user input. If the lead vehicle slows down, or another object is detected by the radar detection system, the system sends a signal to the engine or the braking system to slow the vehicle down accordingly, to maintain a safe following distance.

Known cruise control systems also cancel in the event that a wheel slip event is detected requiring intervention by a traction control system (TCS) or stability control system (SCS). Accordingly, they are not well suited to maintaining vehicle progress when driving in off road conditions where such events may be relatively common.

It is also known to provide a control system for a motor vehicle for controlling one or more vehicle subsystems. U.S. Pat. No. 7,349,776 discloses a vehicle control system comprising a plurality of subsystem controllers including an engine management system, a transmission controller, a steering controller, a brakes controller and a suspension controller. The subsystem controllers are each operable in a plurality of subsystem function modes. The subsystem controllers are connected to a vehicle mode controller which controls the subsystem controllers to assume a required function mode so as to provide a number of driving modes for the vehicle. Each of the driving modes corresponds to a particular driving condition or set of driving conditions, and in each mode each of the sub-systems is set to the function mode most appropriate to those conditions. Such conditions are linked to types of terrain over which the vehicle may be driven such as grass/gravel/snow, mud and ruts, rock crawl, sand and a highway mode known as 'special programs off' (SPO). The vehicle mode controller may be referred to as a Terrain Response (TR) (RTM) System or controller. The driving modes may also be referred to as terrain modes, terrain response modes, or control modes.

It is to desirable to reduce a workload of a user when operating a vehicle in off-road or off-highway conditions.

SUMMARY OF THE INVENTION

Embodiments of the invention may be understood with reference to the appended claims.

Aspects of the present invention provide a system, a vehicle and a method.

In an aspect of the invention for which protection is sought there is provided a method of communicating to a user information in respect of a change in activation state of a vehicle speed control system from an inactive state to an active state, the method being implemented by means of a controller, the active state being a state in which the speed control system controls vehicle speed in accordance with a target speed at least in part by causing application of positive powertrain drive torque as required, the inactive state being a state in which the speed control system is unable to cause application of positive powertrain drive torque, comprising causing a transient increase in a speed of a motor of the powertrain prior to the speed control system controlling vehicle speed in accordance with a target speed in the active state.

The method may further comprise substantially preventing an increase in net driving force on the vehicle as a consequence of the transient increase in motor speed.

As noted below, the controller may form part of the speed control system or be separate therefrom.

It is to be understood that for the purposes of the present invention by the term inactive state is included any state in which the speed control system is not in the active state. Thus the inactive state may be a state such as a 'standby' state or an 'off' state. In some embodiments, in the standby state the speed control system is still operable to control vehicle speed. However, in the standby state the speed control system is not operable to cause application of positive powertrain drive torque. Rather, in some embodiments the speed control system limits vehicle speed such that it does not exceed a target speed by application of a braking system when in the standby mode.

Some embodiments of the present invention have the advantage that a user may be provided with confirmation of the change in activation state of the speed control system, without being required to divert their eyes from terrain ahead of the vehicle in order to view a visual indication of speed control system status. Rather, in some embodiments the user may detect the change in activation state by detecting a transient change in noise, vibration or harshness (NVH) generated by the motor when the change in speed of the motor takes place.

By the term transient is meant that the change in motor speed from the speed that would otherwise be assumed by the motor is impermanent, lasting only a relatively short period of time. Thus the transient change may be a change that is superimposed on motor speed under the control of a motor controller. The motor controller may be arranged in normal operation to control motor speed in accordance with a torque demand signal or motor speed signal provided to the motor controller. The torque demand or motor speed signal may be generated at least in part in dependence on a position of a user-operated accelerator control such as an accelerator pedal or by means of a speed control system such as a cruise control system, an off-road speed control system, or any other suitable system. The motor controller may be operable to superimpose the transient change in motor speed on normal operation of the motor by the controller when required to do so.

Since a user typically cannot avoid hearing the sound of the motor whilst the vehicle is being driven, embodiments of the invention have the advantage that distraction of a user's attention when an indication is provided to the user that the speed control system is active may be reduced, compared with a method in which a separate sound is generated such as a chime sound, whilst providing an intuitive indication that the speed control system is active. Furthermore, a user may be reassured that the speed control system has control of powertrain torque due to the transient increase in engine speed.

In addition, because an increase in net driving force on the vehicle as a result of the transient increase in motor speed is substantially prevented, unintended acceleration of the vehicle may be substantially prevented.

It is to be understood that in some embodiments the speed control system compensates for the variation in motor speed to ensure that it results in a variation in perceivable cabin sound and/or vibration but not a variation in vehicle speed.

In some embodiments, the speed control system may temporarily change an accelerator pedal map, for example a map of torque demand as a function of pedal position. This may be useful in avoiding lurching or shuddering of the vehicle.

In some embodiments, when the speed control system assumes the active state the method comprises opening a clutch device or other means for accommodating an increase in motor speed without causing a corresponding increase in net drive torque at one or more wheels. The controller then causes the transient increase in motor speed, before closing the clutch device. This method may be particularly suitable for vehicles having manual gearboxes and a clutch between the gearbox and driveline that may be caused by the controller to open and close.

In some embodiments, when the speed control system exits the active state the controller is configured to open the clutch device and again cause the transient increase in motor speed, before closing the clutch device.

In some embodiments, whilst the clutch device is open to allow the transient increase in motor speed, the speed control system is configured to limit acceleration of the vehicle under gravity by means of a braking system.

It is known to provide a vehicle speed control system operable to limit vehicle speed to a target speed such that if a vehicle is descending a hill the speed of the vehicle is prevented from exceeding the target speed by application of a braking system as required. Such systems are known as hill descent control (HDC) systems. It is to be understood that when the transient increase in motor speed is occurring, in some embodiments the HDC system limits vehicle speed to the speed at which the vehicle is travelling when the speed control system changes from an inactive state to an active state, or vice versa. The speed may be limited to the speed of travel of the vehicle at the instant the speed control system changes activation state although other arrangements are also useful.

When the speed control system assumes an inactive state from the active state the controller may be configured to cause a momentary hesitation in response by the motor to accelerator pedal input in order to provide an intuitive and repeatable vehicle response when the speed control system is exiting the active state. The controller may be configured to select an appropriate accelerator pedal map for operation following exiting of the active state. The accelerator pedal map may be arranged to be a relatively soft map at least initially, for which relatively large accelerator pedal movement is required for a given increase in powertrain torque, and to blend to a map appropriate to the prevailing terrain if required.

It is to be understood that the transient increase in motor speed may be arranged to take place substantially immediately before, during or after the change in activation state of the speed control system.

Optionally, substantially preventing an increase in net driving force on the vehicle as a consequence of the transient increase in motor speed comprises causing a transient increase in brake force applied by a braking system to one or more wheels.

This feature has the advantage that any change in net torque at a wheel as a consequence of the transient increase in motor speed may be substantially prevented, reducing an effect of the transient increase on vehicle acceleration and wheel slip. It is to be understood that if a wheel is operating at a traction limit of the wheel such that a further increase in net drive torque on the wheel will result in slip of the wheel, this feature may advantageously prevent the increase in slip from occurring in the event that a transient increase in motor speed takes place.

The braking system may comprise a regenerative braking system and/or a friction braking system.

It is to be understood that the transient increase in brake force may be an increase in brake force from substantially zero brake force. In some embodiments having one or more non-driven wheels being wheels not driven by the powertrain, the brake force may be applied to one or more said one or more non-driven wheels only. Alternatively, the brake force may be applied to one or more driven wheels and optionally in addition one or more non-driven wheels. By driven wheel is meant a wheel coupled in a powertrain such that the wheel is driven by the powertrain. In embodiments in which all wheels are driven by the powertrain, brake force may be applied to one or more of the wheels, optionally all the wheels of one axle only, further optionally all driven wheels.

The method may further comprise causing a transient decrease in motor speed.

In some embodiments the system may cause an increase and a decrease in motor speed when the speed control system assumes the active state.

Other arrangements are also useful, such as a plurality of transient increases and/or a plurality or transient decreases in motor speed. The motor speed may be controlled to dwell at one or more different respective speeds for a period sufficient to provide an indication to a driver that the speed control system as changed activation state.

The method may comprise causing a transient change in motor speed when the speed control system changes from the active state to an inactive state.

The system may cause a transient increase in motor speed when the speed control system changes to the active state, and a transient increase in motor speed when the speed control system changes from the active state to an inactive state. Alternatively, the system may cause a transient increase in motor speed when the speed control system changes to the active state, and a transient decrease in motor speed when the speed control system changes from the active state to an inactive state. Other arrangements are also useful.

The method may comprise causing a transient increase in the speed of a motor of the vehicle upon a change in activation state of an off-highway speed control system from an inactive state to an active state.

By off-highway (or low speed) speed control system is meant a speed control system configured to control vehicle speed under off-highway or off-road conditions where a vehicle may experience relative rough, slippery terrain. In some embodiments a vehicle controller may be arranged to implement a method according to an embodiment of the invention only when an off-highway speed control system changes activation state and not when an on-highway speed control system changes activation state.

The method may comprise causing a transient increase in a speed of a motor of the vehicle upon a change in activation state of the off-highway speed control system from an inactive state to the active state but not a change in activation state of a cruise control system.

The method may comprise causing by means of the vehicle speed control system a vehicle to operate in accordance with a target speed value by controlling an amount of brake torque applied by a braking system and an amount of drive torque applied by a powertrain to one or more wheels of the vehicle.

The method may comprise causing the transient increase in speed of a motor only when the vehicle is travelling at a speed below an upper threshold speed.

The upper threshold speed may have any suitable value, optionally in the range from 10 kph to 50 kph. Other values are also useful.

The method may comprise causing the transient increase in speed of a motor only when the vehicle is travelling at a speed above a lower threshold speed.

The lower threshold speed may have any suitable value, optionally in the range from 1 kph to 5 kph. Other values are also useful.

In some embodiments the method may comprise causing the transient change in motor speed such that a motor assumes for a predetermined period each of a plurality of respective motor speeds sequentially.

The method may comprise causing a transient increase in brake force to induce deceleration of the vehicle, subsequently causing the transient increase in the speed of a motor of the powertrain prior to controlling vehicle speed in accordance with the target speed in the active state.

This feature has the advantage that the driver may be provided with positive confirmation of operation of the braking system and powertrain under the control of the speed control system. Furthermore, deceleration of the vehicle due to application of the braking system may be compensated at least in part in some embodiments by subsequent acceleration of the vehicle due to the subsequent transient increase in motor speed. In some embodiments the method may be arranged whereby the overall speed change of the vehicle is substantially zero.

Optionally, the method comprises causing a transient increase in a speed of a motor, subsequently causing a transient increase in brake force to induce deceleration of the vehicle, prior to controlling vehicle speed in accordance with a target speed in the active state.

In an aspect of the invention for which protection is sought there is provided a vehicle controller configured to implement the method of the preceding aspect.

In one aspect of the invention for which protection is sought there is provided a vehicle controller operable to communicate to a user of a vehicle information in respect of a change in activation state of a speed control system from an inactive state to an active state, the active state being a state in which the speed control system controls vehicle speed in accordance with a target speed at least in part by causing application of positive powertrain drive torque as required, the inactive state being a state in which the speed control system is unable to cause application of positive powertrain drive torque, the controller being operable to communicate the change by causing a transient increase in a speed of a motor of the powertrain prior to the speed control system controlling vehicle speed in accordance with a target speed in the active state.

The controller may be arranged to control the vehicle substantially to prevent an increase in net driving force on the vehicle as a consequence of the transient increase in motor speed.

The controller may be operable to cause a transient increase in a speed of a motor of the vehicle upon a change in activation state of a vehicle speed control system, wherein when the speed control system is active the speed control system causes the vehicle to operate in accordance with a target speed value by controlling an amount of brake torque applied by a braking system and an amount of drive torque applied by a powertrain to one or more wheels of the vehicle.

Optionally, the speed control system is operable to assume first and second respective inactive states, wherein in the first inactive state the speed control system does not control vehicle speed and in the second inactive state the speed control system controls vehicle speed in accordance with a target speed by application of brake force and not by application of positive powertrain drive torque.

Optionally the controller is comprised by the speed control system.

In one aspect of the invention for which protection is sought there is provided a vehicle comprising a controller according to a preceding aspect.

In a further aspect of the invention for which protection is sought there is provided a method of communicating to a user information in respect of a change in activation state of a vehicle speed control system from an inactive state to an active state, the method being implemented by means of a controller, causing a transient increase in a speed of a motor of the powertrain substantially immediately before, during or after the change in activation state of the speed control system, the method further comprising substantially preventing an increase in net driving force on the vehicle as a consequence of the transient increase in motor speed.

In an aspect of the invention for which protection is sought there is provided a method of communicating to a user of a vehicle that a vehicle system has changed activation state whilst a vehicle is being driven comprising causing a transient change in a speed of a motor of the vehicle upon a change in activation state of the system, the method further comprising substantially preventing an increase in net driving force on the vehicle as a consequence of the transient increase in motor speed.

Some embodiments of the present invention have the advantage that a user may be provided with confirmation of a change in activation state of a system, which may for example be activation and/or deactivation of the system, without being required to divert their eyes from terrain ahead of the vehicle. Rather, in some embodiments the user may detect that the system has been activated and/or deactivated by detecting a transient change in pitch of a sound generated by the motor when the change in speed of the motor takes place.

In an aspect of the invention for which protection is sought there is provided a method of communicating to a user information in respect of a change in activation state of a vehicle speed control system from an inactive state to an active state, the method being implemented by means of a controller, the active state being a state in which the speed control system is operable to control vehicle speed in accordance with a target speed, comprising causing a transient increase in a speed of a motor of the powertrain prior to the speed control system controlling vehicle speed in accordance with a target speed in the active state.

Optionally, in the active state the speed control system is operable to control vehicle speed in accordance with a target speed at least in part by causing application of positive powertrain drive torque, optionally positive powertrain drive torque and brake torque. The inactive state may be a state in which the speed control system does not cause application of positive powertrain drive torque.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

An embodiment of the invention will now be described, by way of example only, with reference to the following figures in which:

FIG. 5 illustrates a steering wheel and brake and accelerator pedals of a vehicle according to an embodiment of the present invention; and FIG. 6 is a flowchart illustrating operation of a vehicle according to an embodiment of the present invention.

DETAILED DESCRIPTION

References herein to a block such as a function block are to be understood to include reference to software code for performing the function or action specified which may be an output that is provided responsive to one or more inputs. The code may be in the form of a software routine or function called by a main computer program, or may be code forming part of a flow of code not being a separate routine or function. Reference to function block is made for ease of explanation of the manner of operation of embodiments of the present invention.

Figure 1:
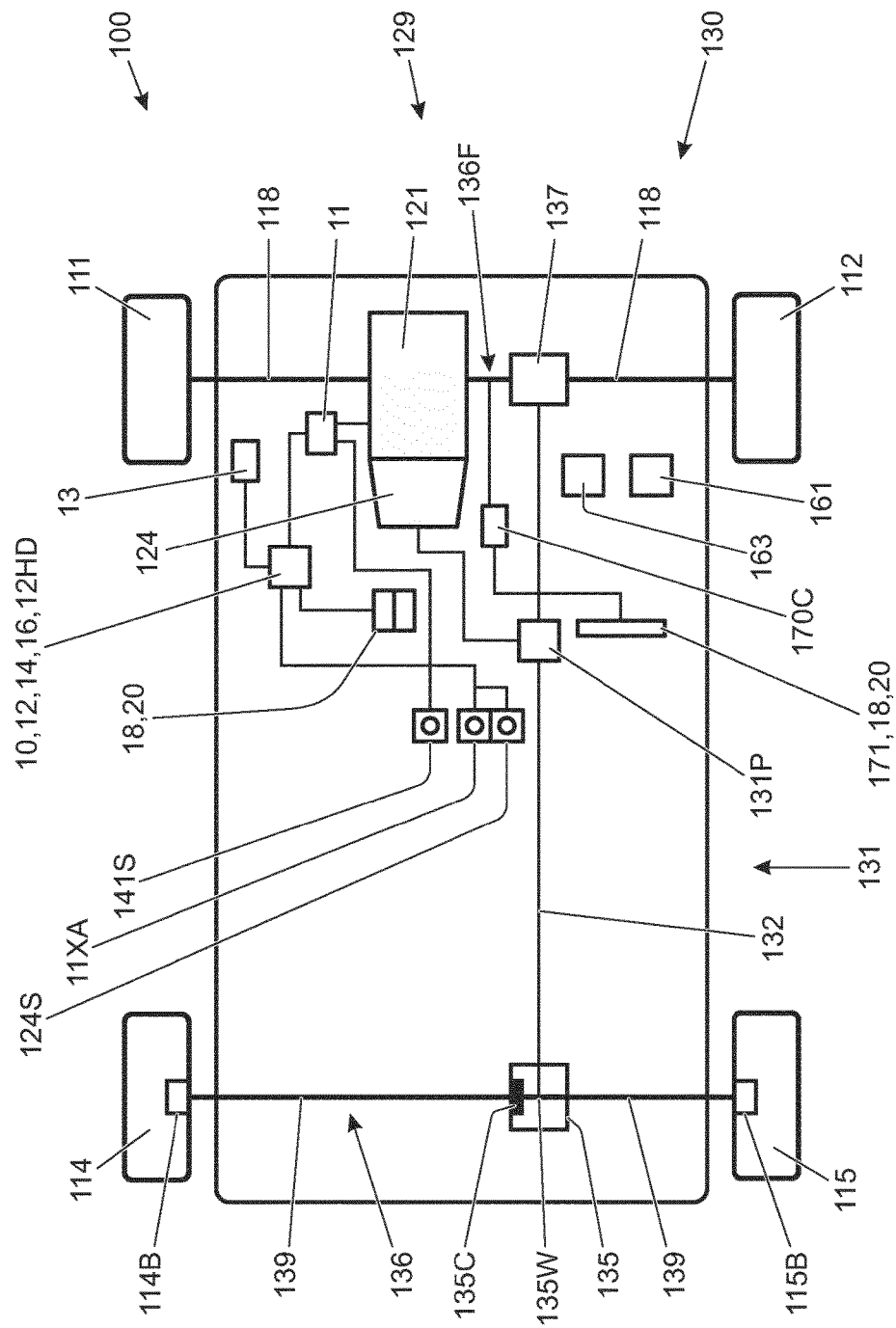
FIG. 1 is a schematic illustration of a vehicle according to an embodiment of the invention in plan view.
Figure 2:
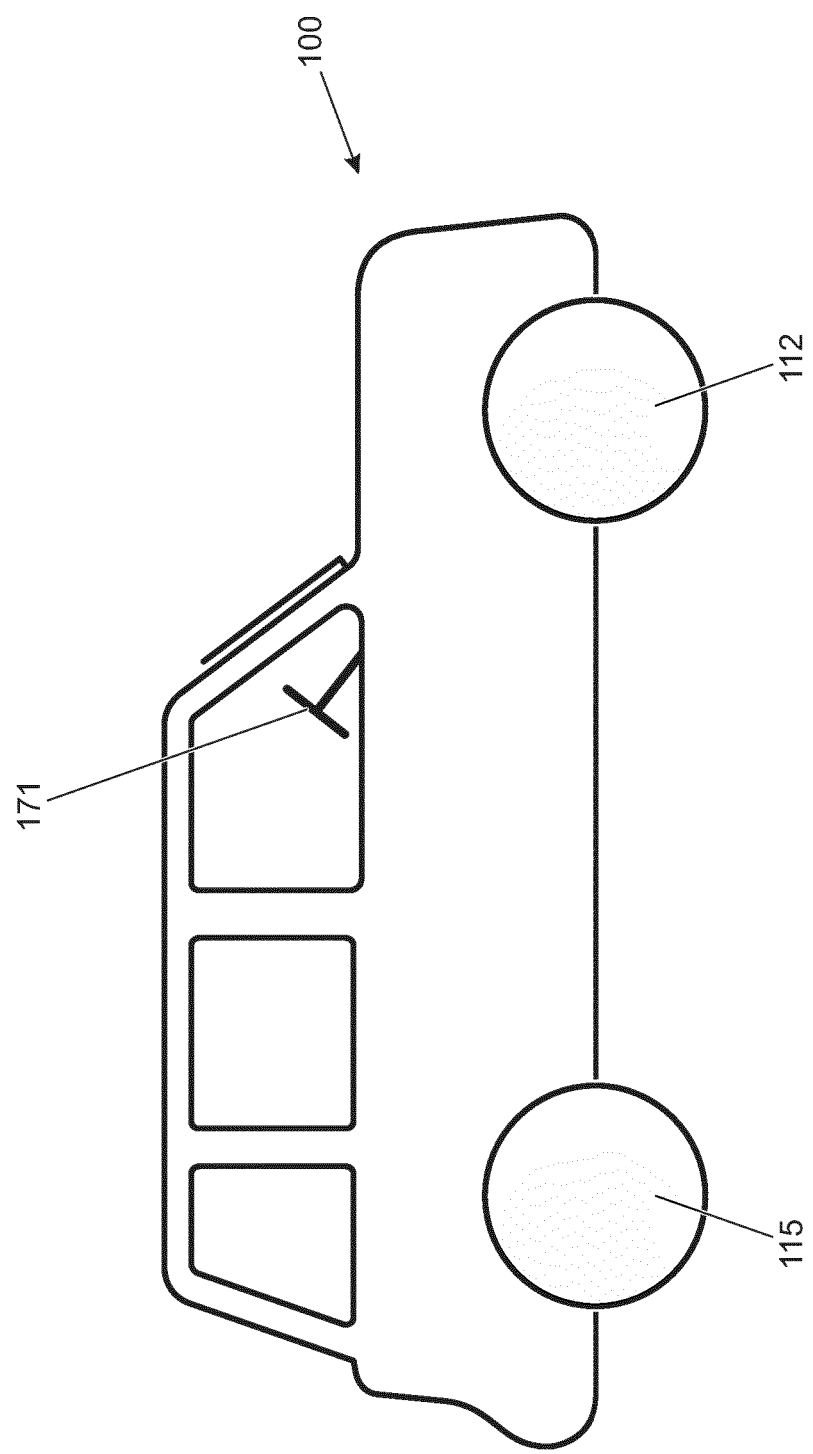
FIG. 2 shows the vehicle of FIG. 1 in side view.

FIG. 1 shows a vehicle 100 according to an embodiment of the present invention. The vehicle 100 has a powertrain 129 that includes an engine 121 that is connected to a driveline 130 having an automatic transmission 124. It is to be understood that embodiments of the present invention are also suitable for use in vehicles with manual transmissions, continuously variable transmissions or any other suitable transmission.

In the embodiment of FIG. 1 the transmission 124 may be set to one of a plurality of transmission operating modes, being a park mode, a reverse mode, a neutral mode, a drive mode or a sport mode, by means of a transmission mode selector dial 124S. The selector dial 124S provides an output signal to a powertrain controller 11 in response to which the powertrain controller 11 causes the transmission 124 to operate in accordance with the selected transmission mode.

The driveline 130 is arranged to drive a pair of front vehicle wheels 111, 112 by means of a front differential 137 and a pair of front drive shafts 118. The driveline 130 also comprises an auxiliary driveline portion 131 arranged to drive a pair of rear wheels 114, 115 by means of an auxiliary driveshaft or prop-shaft 132, a rear differential 135 and a pair of rear driveshafts 139.

Embodiments of the invention are suitable for use with vehicles in which the transmission is arranged to drive only a pair of front wheels or only a pair of rear wheels (i.e. front wheel drive vehicles or rear wheel drive vehicles) or selectable two wheel drive/four wheel drive vehicles. In the embodiment of FIG. 1 the transmission 124 is releasably connectable to the auxiliary driveline portion 131 by means of a power transfer unit (PTU) 131P, allowing operation in a two wheel drive mode or a four wheel drive mode. It is to be understood that embodiments of the invention may be suitable for vehicles having more than four wheels or where only two wheels are driven, for example two wheels of a three wheeled vehicle or four wheeled vehicle or a vehicle with more than four wheels.

Figure 3:
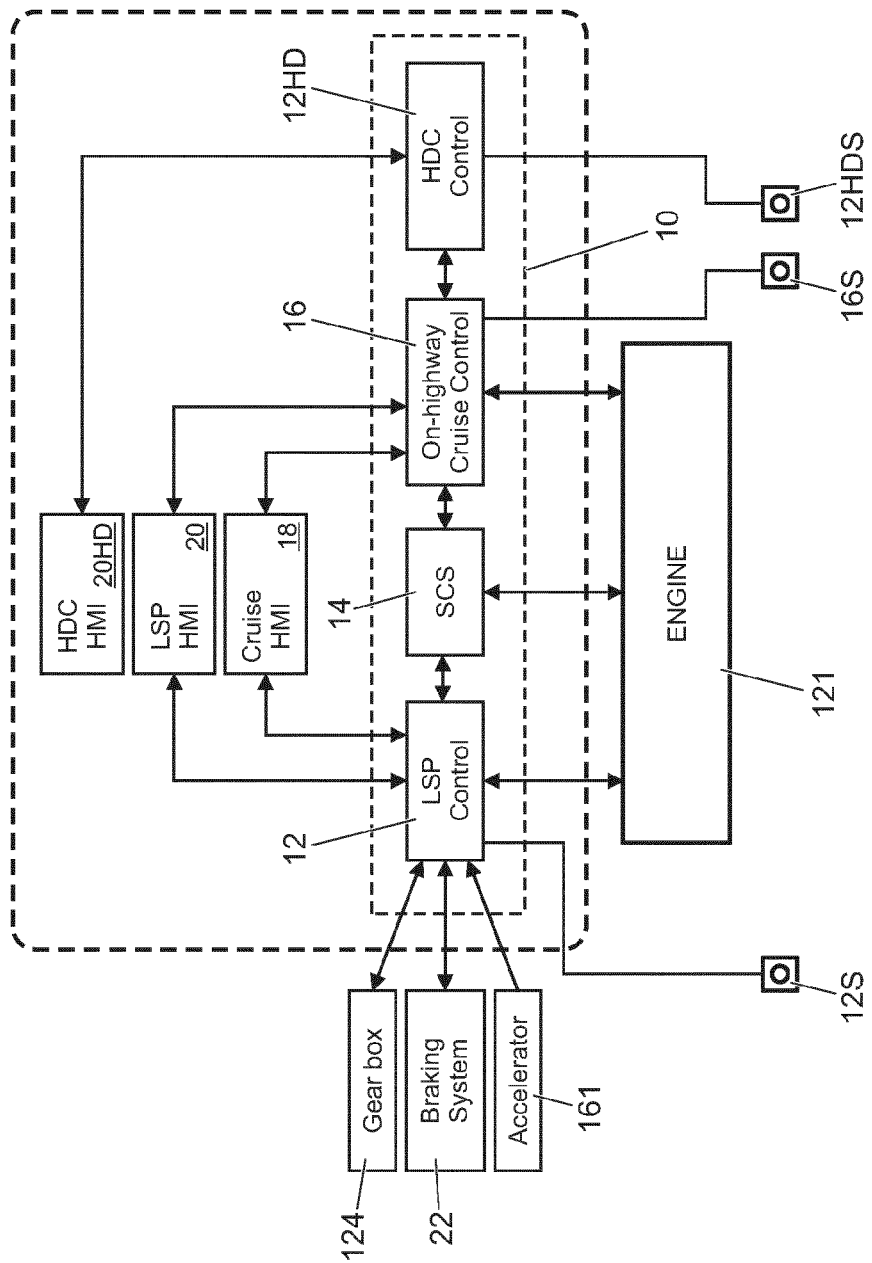
FIG. 3 is a high level schematic diagram of a vehicle speed control system of an embodiment of the present invention, including a cruise control system and a low-speed progress control system.

A control system for the vehicle engine 121 includes a central controller 10, referred to as a vehicle control unit (VCU) 10, the powertrain controller 11, a brake controller 13 and a steering controller 170C. The brake controller 13 forms part of a braking system 22 (FIG. 3). The VCU 10 receives and outputs a plurality of signals to and from various sensors and subsystems (not shown) provided on the vehicle. The VCU 10 includes a low-speed progress (LSP) control system 12 shown in FIG. 3 and a stability control system (SCS) 14. The SCS 14 improves the safety of the vehicle 100 by detecting and managing loss of traction. When a reduction in traction or steering control is detected, the SCS 14 is operable automatically to command a brake controller 13 to apply one or more brakes of the vehicle to help to steer the vehicle 100 in the direction the user wishes to travel. In the embodiment shown the SCS 14 is implemented by the VCU 10. In some alternative embodiments the SCS 14 may be implemented by the brake controller 13. Further alternatively, the SCS 14 may be implemented by a separate controller.

Although not shown in detail in FIG. 3, the VCU 10 further includes a Dynamic Stability Control (DSC) function block, a Traction Control (TC) function block, an Anti-Lock Braking System (ABS) function block and a Hill Descent Control (HDC) function block. These function blocks are implemented in software code run by a computing device of the VCU 10 and provide outputs indicative of, for example, DSC activity, TC activity, ABS activity, brake interventions on individual wheels and engine torque requests from the VCU 10 to the engine 121 in the event a wheel slip event occurs. Each of the aforementioned events indicate that a wheel slip event has occurred. Other vehicle sub-systems such as a roll stability control system or the like may also be useful.

As noted above, the vehicle 100 also includes a cruise control system 16 which is operable to automatically maintain vehicle speed at a selected speed when the vehicle is travelling at speeds in excess of 25 kph. The cruise control system 16 is provided with a cruise control HMI (human machine interface) 18 by which means the user can input a target vehicle speed to the cruise control system 16 in a known manner. In one embodiment of the invention, cruise control system input controls are mounted to a steering wheel 171 (FIG. 5). The cruise control system 16 may be switched on by pressing a cruise control system selector button 176. When the cruise control system 16 is switched on, depression of a 'set-speed' control 173 sets the current value of a cruise control set-speed parameter, cruise_set-speed to the current vehicle speed. Depression of a '+' button 174 allows the value of cruise_set-speed to be increased whilst depression of a '−' button 175 allows the value of cruise_set-speed to be decreased. A resume button 173R is provided that is operable to control the cruise control system 16 to resume speed control at the instant value of cruise_set-speed following driver over-ride. It is to be understood that known on-highway cruise control systems including the present system 16 are configured so that, in the event that the user depresses a brake pedal 163 or, in the case of vehicles with a manual transmission, a clutch pedal (not shown), the cruise control function is cancelled and the vehicle 100 reverts to a manual mode of operation which requires accelerator pedal input by a user in order to maintain vehicle speed. In addition, detection of a wheel slip event, as may be initiated by a loss of traction, also has the effect of cancelling the cruise control function. Speed control by the system 16 is resumed if the driver subsequently depresses the resume button 173R.

The cruise control system 16 monitors vehicle speed and any deviation from the target vehicle speed is adjusted automatically so that the vehicle speed is maintained at a substantially constant value, typically in excess of 25 kph. In other words, the cruise control system is ineffective at speeds lower than 25 kph. The cruise control HMI 18 may also be configured to provide an alert to the user about the status of the cruise control system 16 via a visual display of the HMI 18. In the present embodiment the cruise control system 16 is configured to allow the value of cruise_set-speed to be set to any value in the range 25-150 kph.

The LSP control system 12 also provides a speed-based control system for the user which enables the user to select a very low target speed at which the vehicle can progress without any pedal inputs being required by the user. Low-speed speed control (or progress control) functionality is not provided by the on-highway cruise control system 16 which operates only at speeds above 25 kph. The system 12 is operable to apply selective powertrain, traction control and braking actions to one or more wheels of the vehicle 100, collectively or individually, to maintain the vehicle 100 at the desired speed.

The LSP control system 12 is activated by means of a LSP control system selector button 172 mounted on the steering wheel 171.

The LSP control system 12 is configured to allow a user to input a desired value of set-speed parameter, LSP_set-speed to the LSP control system 12 via a low-speed progress control HMI (LSP HMI) 20 (FIG. 1, FIG. 3) which shares certain input buttons 173-175 with the cruise control system 16 and a hill descent control (HDC) control system 12HD. Provided the vehicle speed is within the allowable range of operation of the LSP control system (which is the range from 2 to 30 kph in the present embodiment although other ranges are also useful) the LSP control system 12 controls vehicle speed in accordance with the value of LSP_set-speed. Unlike the cruise control system 16, the LSP control system 12 is configured to operate independently of the occurrence of a traction event. That is, the LSP control system 12 does not cancel speed control upon detection of wheel slip. Rather, the LSP control system 12 actively manages vehicle behaviour when slip is detected.

If the driver presses the 'set' button 173 whilst the LSP control system 12 is active the value of LSP_set-speed is set to the instant vehicle speed. If the driver presses the 'resume' button 173R the LSP control system 12 controls vehicle speed in accordance with the current (most recently used) value of LSP_set-speed. If the LSP control system 12 has not been activated since the vehicle 100 was last started from a key-off condition, the LSP control system 12 may be configured to ignore depression of the 'resume' button 173R until the driver has set a value of LSP set-speed, for example by depressing the 'set' button 173. Other arrangements are also useful.

The LSP control HMI 20 is provided in the vehicle cabin so as to be readily accessible to the user. The user of the vehicle 100 is able to input to the LSP control system 12, via the LSP HMI 20, an indication of the speed at which the user desires the vehicle to travel (referred to as "the target speed") by means of the 'set-speed' button 173 and the '+'/'−' buttons 174, 175 in a similar manner to the cruise control system 16. The LSP HMI 20 also includes a visual display upon which information and guidance can be provided to the user about the status of the LSP control system 12.

The LSP control system 12 receives an input from the braking system 22 of the vehicle indicative of the extent to which the user has applied braking by means of the brake pedal 163. The LSP control system 12 also receives an input from an accelerator pedal 161 indicative of the extent to which the user has depressed the accelerator pedal 161. An input is also provided to the LSP control system 12 from the transmission or gearbox 124. This input may include signals representative of, for example, the speed of an output shaft of the gearbox 124, torque converter slip and a gear ratio request. Other inputs to the LSP control system 12 include an input from the cruise control HMI 18 which is representative of the status (ON/OFF) of the cruise control system 16, and an input from the LSP control HMI 20.

The HDC function block of the VCU 10 forms part of the HDC system 12HD. When the HDC system 12HD is active, the system 12HD controls the braking system 22 (of which the ABS function block forms part) in order to limit vehicle speed to a value corresponding to that of a HDC set-speed parameter HDC_set-speed which may be set by a user. The HDC set-speed may also be referred to as an HDC target speed. Provided the user does not override the HDC system by depressing the accelerator pedal when the HDC system is active, the HDC system 12HD controls the braking system 22 (FIG. 3) to prevent vehicle speed from exceeding the HDC_set-speed. In the present embodiment the HDC system 12HD is not operable to apply positive drive torque. Rather, the HDC system 12HD is only operable to apply negative brake torque.

A HDC system HMI 20HD is provided by means of which a user may control the HDC system 12HD, including setting the value of HDC_set-speed. An HDC system selector button 177 is provided on the steering wheel 171 by means of which a user may activate the HDC system 12HD to control vehicle speed.

As noted above, the HDC system 12HD is operable to allow a user to set a value of HDC set-speed parameter HDC_set-speed and to adjust the value of HDC_set-speed using the same controls as the cruise control system 16 and LSP control system 12. Thus, in the present embodiment, when the HDC system 12HD is controlling vehicle speed, the HDC system set-speed may be increased, decreased or set to an instant speed of the vehicle in a similar manner to the set-speed of the cruise control system 16 and LSP control system, using the same control buttons 173, 173R, 174, 175. The HDC system 12HD is operable to allow the value of HDC_set-speed to be set to any value in the range from 2-30 kph.

If the HDC system 12HD is selected when the vehicle 100 is travelling at a speed of 50 kph or less and no other speed control system is in operation, the HDC system 12HD sets the value of HDC_set-speed to a value selected from a look-up table. The value output by the look-up table is determined in dependence on the identity of the currently selected transmission gear, the currently selected PTU gear ratio (Hi/LO) and the currently selected driving mode. The HDC system 12HD then applies the powertrain 129 and/or braking system 22 to slow the vehicle 100 to the HDC system set-speed provided the driver does not override the HDC system 12HD by depressing the accelerator pedal 161. The HDC system 12HD is configured to slow the vehicle 100 to the set-speed value at a deceleration rate not exceeding a maximum allowable rate. The rate is set as 1.25 ms-2 in the present embodiment, however other values are also useful. If the user subsequently presses the 'set-speed' button 173 the HDC system 12HD sets the value of HDC_set-speed to the instant vehicle speed provided the instant speed is 30 kph or less. If the HDC system 12HD is selected when the vehicle 100 is travelling at a speed exceeding 50 kph, the HDC system 12HD ignores the request and provides an indication to the user that the request has been ignored due to the vehicle speed being above the limit for operation of the system HDC 12HD.

It is to be understood that the VCU 10 is configured to implement a known Terrain Response (TR) (RTM) System of the kind described above in which the VCU 10 controls settings of one or more vehicle systems or sub-systems such as the powertrain controller 11 in dependence on a selected driving mode. The driving mode may be selected by a user by means of a driving mode selector 141S (FIG. 1). The driving modes may also be referred to as terrain modes, terrain response modes, or control modes. In the embodiment of FIG. 1 four driving modes are provided: an 'on-highway' driving mode suitable for driving on a relatively hard, smooth driving surface where a relatively high surface coefficient of friction exists between the driving surface and wheels of the vehicle; a 'sand' driving mode suitable for driving over sandy terrain; a 'grass, gravel or snow' driving mode suitable for driving over grass, gravel or snow, a 'rock crawl' driving mode suitable for driving slowly over a rocky surface; and a 'mud and ruts' driving mode suitable for driving in muddy, rutted terrain. Other driving modes may be provided in addition or instead.

In some embodiments, the LSP control system 12 may be in either one of an active condition, a standby condition and an 'off' condition. In the active condition, the LSP control system 12 actively manages vehicle speed by controlling powertrain torque and braking system torque. In the standby condition, the LSP control system 12 does not control vehicle speed until a user presses the resume button 173R or the 'set speed' button 173. In the off condition the LSP control system 12 is not responsive to input controls until the LSP control system selector button 172 is depressed.

In the present embodiment the LSP control system 12 is also operable to assume an intermediate condition similar to that of the active mode but in which the LSP control system 12 is prevented from commanding the application of positive drive torque to one or more wheels of the vehicle 100 by the powertrain 129. Thus, only braking torque may be applied, by means of the braking system 22 and/or powertrain 129. Other arrangements are also useful.

With the LSP control system 12 in the active condition, the user may increase or decrease the vehicle set-speed by means of the '+' and '−' buttons 174, 175. In addition, the user may also increase or decrease the vehicle set-speed by lightly pressing the accelerator or brake pedals 161, 163 respectively. In some embodiments, with the LSP control system 12 in the active condition the '+' and '−' buttons 174, 175 are disabled such that adjustment of the value of LSP_set-speed can only be made by means of the accelerator and brake pedals 161, 163. This latter feature may prevent unintentional changes in set-speed from occurring, for example due to accidental pressing of one of the '+' or '−' buttons 174, 175. Accidental pressing may occur for example when negotiating difficult terrain where relatively large and frequent changes in steering angle may be required. Other arrangements are also useful.

It is to be understood that in the present embodiment the LSP control system 12 is operable to cause the vehicle to travel in accordance with a value of set-speed in the range from 2-30 kph whilst the cruise control system is operable to cause the vehicle to travel in accordance with a value of set-speed in the range from 25-150 kph although other values are also useful. If the LSP control system 12 is selected when the vehicle speed is above 30 kph but less than or substantially equal to 50 kph, the LSP control system 12 assumes the intermediate mode. In the intermediate mode, if the driver releases the accelerator pedal 161 whilst travelling above 30 kph the LSP control system 12 deploys the braking system 22 to slow the vehicle 100 to a value of set-speed corresponding to the value of parameter LSP_set-speed. Once the vehicle speed falls to 30 kph or below, the LSP control system 12 assumes the active condition in which it is operable to apply positive drive torque via the powertrain 129, as well as brake torque via the powertrain 129 (via engine braking) and the braking system 22 in order to control the vehicle in accordance with the LSP_set-speed value. If no LSP set-speed value has been set, the LSP control system 12 assumes the standby mode.

It is to be understood that if the LSP control system 12 is in the active mode, operation of the cruise control system 16 is inhibited. The two systems 12, 16 therefore operate independently of one another, so that only one can be operable at any one time, depending on the speed at which the vehicle is travelling.

In some embodiments, the cruise control HMI 18 and the LSP control HMI 20 may be configured within the same hardware so that, for example, the speed selection is input via the same hardware, with one or more separate switches being provided to switch between the LSP input and the cruise control input.

Figure 4:
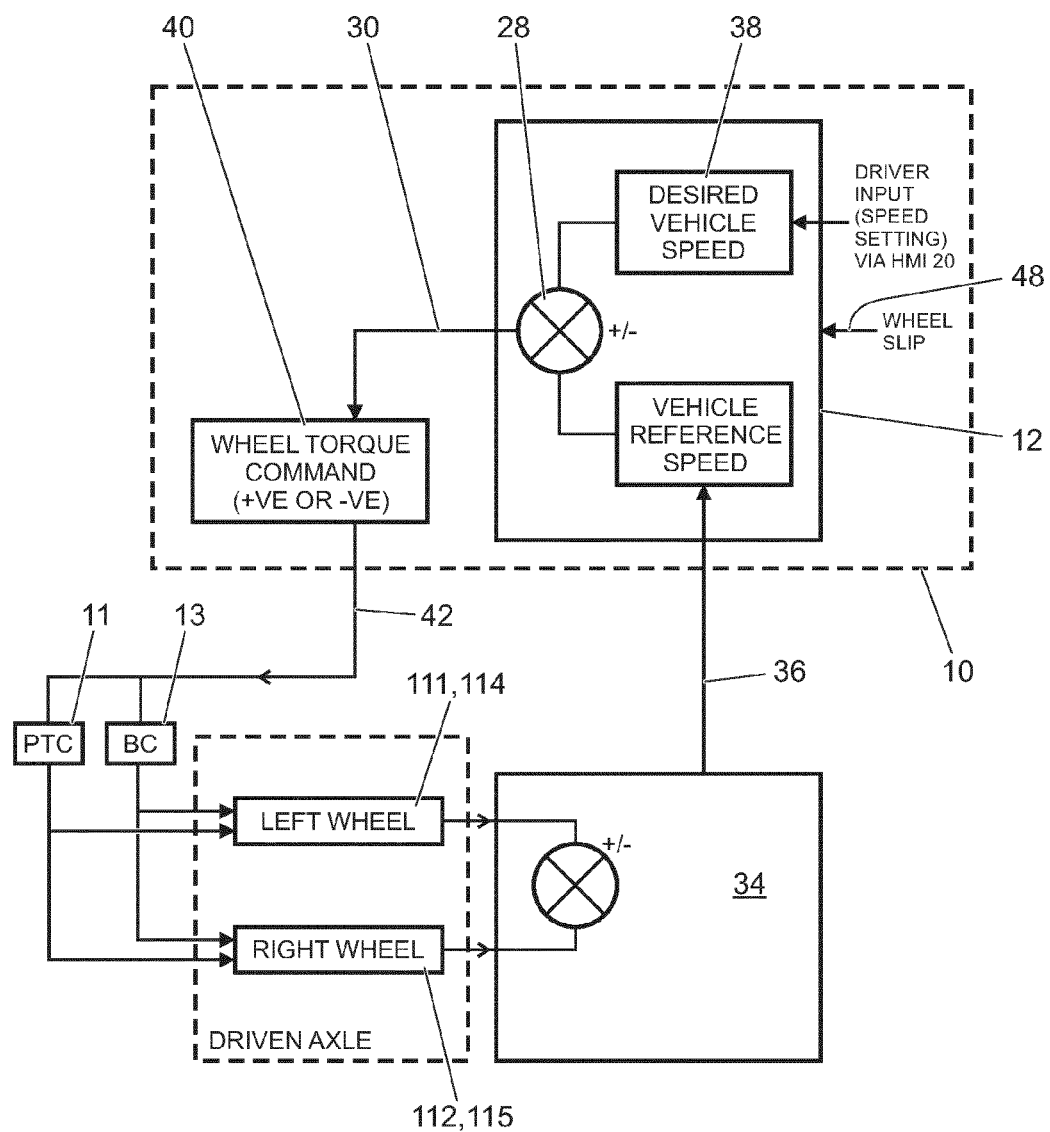
FIG. 4 is a schematic diagram of further features of the vehicle speed control system in FIG. 3.

FIG. 4 illustrates the means by which vehicle speed is controlled in the LSP control system 12. As described above, a speed selected by a user (set-speed) is input to the LSP control system 12 via the LSP control HMI 20. A vehicle speed sensor 34 associated with the powertrain 129 (shown in FIG. 1) provides a signal 36 indicative of vehicle speed to the LSP control system 12. The LSP control system 12 includes a comparator 28 which compares the set-speed 38 (also referred to as a 'target speed' 38) selected by the user with the measured speed 36 and provides an output signal 30 indicative of the comparison. The output signal 30 is provided to an evaluator unit 40 of the VCU 10 which interprets the output signal 30 as either a demand for additional torque to be applied to the vehicle wheels 111-115, or for a reduction in torque applied to the vehicle wheels 111-115, depending on whether the vehicle speed needs to be increased or decreased to maintain the speed LSP_set-speed. An increase in torque is generally accomplished by increasing the amount of powertrain torque delivered to a given position of the powertrain, for example an engine output shaft, a wheel or any other suitable location. A decrease in torque at a given wheel to a value that is less positive or more negative may be accomplished by decreasing powertrain torque delivered to a wheel and/or by increasing a braking force on a wheel. It is to be understood that in some embodiments in which a powertrain 129 has one or more electric machines operable as a generator, negative torque may be applied by the powertrain 129 to one or more wheels by the electric machine. Negative torque may also be applied by means of engine braking in some circumstances, depending at least in part on the speed at which the vehicle 100 is moving. If one or more electric machines are provided that are operable as propulsion motors, positive drive torque may be applied by means of the one or more electric machines.

An output 42 from the evaluator unit 40 is provided to the powertrain controller 11 and brake controller 13 which in turn control a net torque applied to the vehicle wheels 111-115. The net torque may be increased or decreased depending on whether the evaluator unit 40 demands positive or negative torque. In order to cause application of the necessary positive or negative torque to the wheels, the evaluator unit 40 may command that positive or negative torque is applied to the vehicle wheels by the powertrain 129 and/or that a braking force is applied to the vehicle wheels by the braking system 22, either or both of which may be used to implement the change in torque that is necessary to attain and maintain a required vehicle speed. In the illustrated embodiment the torque is applied to the vehicle wheels individually so as to maintain the vehicle at the required speed, but in another embodiment torque may be applied to the wheels collectively to maintain the required speed. In some embodiments, the powertrain controller 11 may be operable to control an amount of torque applied to one or more wheels by controlling a driveline component such as a rear drive unit, front drive unit, differential or any other suitable component. For example, one or more components of the driveline 130 may include one or more clutches operable to allow an amount of torque applied to one or more wheels to be varied. Other arrangements are also useful.

Where a powertrain 129 includes one or more electric machines, for example one or more propulsion motors and/or generators, the powertrain controller 11 may be operable to modulate torque applied to one or more wheels by means of one or more electric machines.

The LSP control system 12 also receives a signal 48 indicative of a wheel slip event having occurred. This may be the same signal 48 that is supplied to the on-highway cruise control system 16 of the vehicle, and which in the case of the latter triggers an override or inhibit mode of operation in the on-highway cruise control system 16 so that automatic control of vehicle speed by the on-highway cruise control system 16 is suspended or cancelled. However, the LSP control system 12 is not arranged to cancel or suspend operation in dependence on receipt of a wheel slip signal 48 indicative of wheel slip. Rather, the system 12 is arranged to monitor and subsequently manage wheel slip so as to reduce driver workload. During a slip event, the LSP control system 12 continues to compare the measured vehicle speed with the value of LSP_set-speed, and continues to control automatically the torque applied to the vehicle wheels so as to maintain vehicle speed at the selected value. It is to be understood therefore that the LSP control system 12 is configured differently to the cruise control system 16, for which a wheel slip event has the effect of overriding the cruise control function so that manual operation of the vehicle must be resumed, or speed control by the cruise control system 12 resumed by pressing the resume button 173R or set-speed button 173.

In a further embodiment of the present invention (not shown) a wheel slip signal 48 is derived not just from a comparison of wheel speeds, but further refined using sensor data indicative of the vehicle's speed over ground. Such a speed over ground determination may be made via global positioning (GPS) data, or via a vehicle mounted radar or laser based system arranged to determine the relative movement of the vehicle 100 and the ground over which it is travelling. A camera system may be employed for determining speed over ground in some embodiments.

At any stage of the LSP control process the user can override the function by depressing the accelerator pedal 161 and/or brake pedal 163 to adjust the vehicle speed in a positive or negative sense. However, in the event that a wheel slip event is detected via signal 48 whilst the LSP control system 12 is active, the LSP control system 12 remains active and control of vehicle speed by the LSP control system 12 is not suspended. As shown in FIG. 4, this may be implemented by providing a wheel slip event signal 48 to the LSP control system 12 which is then managed by the LSP control system 12. In the embodiment shown in FIG. 1 the SCS 14 generates the wheel slip event signal 48 and supplies it to the LSP control system 12 and cruise control system 16. In some arrangements the SCS 14 provides the wheel slip event signal 48 to the LSP control system 12 or cruise control system 16 depending on which system is operating at the time. In some arrangements the SCS 14 broadcasts the signal 48 on a controller area network (CAN) bus (not shown) with which the LSP control system 12 and cruise control system 16 are in communication, whereby the systems 12, 16 may detect the signal 48, A wheel slip event is triggered when a loss of traction occurs at any one of the vehicle wheels. Wheels and tyres may be more prone to losing traction when travelling for example on snow, ice, mud or sand and/or on steep gradients or cross-slopes. A vehicle 100 may also be more prone to losing traction in environments where the terrain is more uneven or slippery compared with driving on a highway in normal on-road conditions. Embodiments of the present invention therefore find particular benefit when the vehicle 100 is being driven in an off-road environment, or in conditions in which wheel slip may commonly occur. Manual operation in such conditions can be a difficult and often stressful experience for the driver and may result in an uncomfortable ride.

The vehicle 100 is also provided with additional sensors (not shown) which are representative of a variety of different parameters associated with vehicle motion and status. These may be inertial systems unique to the LSP or HDC control system 12, 12HD or part of an occupant restraint system or any other sub-system which may provide data from sensors such as gyros and/or accelerometers that may be indicative of vehicle body movement and may provide a useful input to the LSP and/or HDC control systems 12, 12HD. The signals from the sensors provide, or are used to calculate, a plurality of driving condition indicators (also referred to as terrain indicators) which are indicative of the nature of the terrain conditions over which the vehicle is travelling.

The sensors (not shown) on the vehicle 100 include, but are not limited to, sensors which provide continuous sensor outputs to the VCU 10, including wheel speed sensors, as mentioned previously and as shown in FIG. 5, an ambient temperature sensor, an atmospheric pressure sensor, tyre pressure sensors, wheel articulation sensors, gyroscopic sensors to detect vehicular yaw, roll and pitch angle and rate, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor which may be part of the SCS 14, a brake pedal position sensor, a brake pressure sensor, an accelerator pedal position sensor, longitudinal, lateral and vertical motion sensors, and water detection sensors forming part of a vehicle wading assistance system (not shown). In other embodiments, only a selection of the aforementioned sensors may be used.

The VCU 10 also receives a signal from the steering controller 170C. The steering controller 170C is in the form of an electronic power assisted steering unit (ePAS unit). The steering controller 170C provides a signal to the VCU 10 indicative of the steering force being applied to steerable road wheels 111, 112 of the vehicle 100. This force corresponds to that applied by a user to the steering wheel 171 in combination with steering force generated by the ePAS unit 170C.

The VCU 10 evaluates the various sensor inputs to determine the probability that each of a plurality of different control modes (driving modes) for the vehicle subsystems is appropriate, with each control mode corresponding to a particular terrain type over which the vehicle is travelling (for example, mud and ruts, sand, grass/gravel/snow).

If the user has selected operation of the vehicle in an automatic driving mode selection condition, the VCU 10 then selects the most appropriate one of the control modes and is configured automatically to control the subsystems according to the selected mode. This aspect of the invention is described in further detail in our co-pending patent application nos. GB2492748, GB2492655 and GB2499279, the contents of each of which is incorporated herein by reference.

The nature of the terrain over which the vehicle is travelling (as determined by reference to the selected control mode) may also be utilised in the LSP control system 12 to determine an appropriate increase or decrease in drive torque that is to be applied to the vehicle wheels. For example, if the user selects a value of LSP_set-speed that is not suitable for the nature of the terrain over which the vehicle is travelling, the system 12 is operable to automatically adjust the vehicle speed downwards by reducing the speed of the vehicle wheels. In some cases, for example, the user selected speed may not be achievable or appropriate over certain terrain types, particularly in the case of uneven or rough surfaces. If the system 12 selects a set-speed that differs from the user-selected set-speed, a visual indication of the speed constraint is provided to the user via the LSP HMI 20 to indicate that an alternative speed has been adopted.

A-581 System Activation Motor Speed Blip

The LSP control system 12 is configured wherein when the LSP control system 12 changes state to assume the active condition or state, the system 12 causes a transient increase in a speed of the engine 121 to provide positive confirmation to a user that the system 12 is now in the active condition. The LSP control system 12 causes the momentary increase in engine speed by commanding the powertrain controller 11 to cause an increase in torque delivered by the engine 121. In some alternative embodiments the control system 12 commands directly an increase in engine speed rather than engine torque. The process of causing a momentary increase in motor or engine speed from an instant engine speed when the active state of the system 12 is selected and allowing engine speed subsequently to fall to the former instant value may be referred to as an engine or motor speed blip operation.

The LSP control system 12 monitors vehicle acceleration in response to the increase in motor speed and commands the brake controller 13 to control the braking system 22 as required to cause a retarding force on vehicle progress in order substantially to prevent an increase in vehicle speed as a consequence of the motor speed blip operation. The amount of braking is modulated in a closed loop feedback arrangement. The amount of braking is thereby applied in synchrony with the increase in engine speed such that lag in engine response due for example to rotational inertia of the engine 121 and one or more other portions of the powertrain 129 is taken into account by virtue of the closed loop feedback arrangement. It is to be understood that the increase in motor speed may be accommodated by slip of one or more clutches of a transmission and/or driveline, particularly in the case of an automatic transmission 124.

In some embodiments, a driveline or transmission clutch is opened to reduce or eliminate load on the engine 121 whilst the momentary increase in engine speed takes place. The LSP control system 12 and/or HDC system 12 may be arranged to prevent unwanted changes in vehicle speed whilst the clutch is open.

In the present embodiment the braking system 22 is a hydraulic braking system 22 and the LSP control system 12 commands the brake controller 13 to increase the amount of brake pressure applied by the braking system 22 in order to actuate the one or more brakes of the vehicle as required. A regenerative braking system may be applied in some embodiments, enabling recovery of energy that would otherwise be lost as heat in a friction braking system.

In some embodiments, the LSP control system 12 is configured deliberately to cause a transient increase in vehicle acceleration when the LSP control system 12 transitions to the active state in order to provide a further indication to a user of the change in state of the control system 12. The transient increase may be followed by a transient decrease in acceleration, or vice versa, to compensate at least in part therefor.

In some embodiments, rather than employing a closed loop feedback arrangement to modulate brake pressure in response to any detected increase in acceleration, the LSP control system 12 commands the brake controller 13 to cause an increase in brake pressure by a substantially fixed amount regardless of vehicle speed. The increase in brake pressure may be timed to coincide with the increase in engine speed so as to compensate at least in part for the increase in powertrain torque applied to driven wheels of the vehicle 100 when the engine speed is increased. Thus in some embodiments the LSP control system 12 may be arranged not to cause the increase in brake pressure in dependence on measurement of vehicle acceleration. However, other arrangements are also useful.

In some embodiments the increase in brake pressure is applied so as to intentionally cause momentary deceleration of the vehicle so as to provide further confirmation to a driver that the LSP control system 12 is functioning. Thus, an indication is provided to the driver that the LSP control system 12 is in control of the powertrain 129 (signified by the increase in engine speed) as well as the braking system 22 (signified by the momentary deceleration as the braking system 22 is applied). The transient increase in brake pressure may be applied after the transient increase in engine speed. Alternatively the transient increase in brake pressure may be applied before the transient increase in engine speed. This latter procedure has the advantage that in some embodiments it may be arranged such that the increase in engine speed causes an increase in drive torque applied to one or more wheels, which may be employed to ensure that vehicle speed recovers back to the speed prior to application of the transient increase in brake pressure. Thus, a drop in vehicle speed may occur, followed by at least partial recovery of vehicle speed.

In some embodiments, the LSP control system causes the powertrain controller 11 to both cause the increase in engine speed and also to accommodate the increase in engine speed without causing an increase in drive torque at any wheel of the vehicle. Thus the braking system 22 is not employed to compensate for the increase in engine speed. The accommodation of engine speed increase may be caused by the powertrain controller 11 for example by allowing slip of one or more clutches, torque converters or the like that may form part of the powertrain 129. Other arrangements are also useful.

In the present embodiment, the transient increase in engine speed is arranged to be an increase in engine speed of around 200 rpm followed by a substantially immediate decrease back to a value corresponding to an instant amount demanded before the LSP control system 12 was activated. In some embodiments the control system 12 may be arranged to increase engine speed, hold engine speed at a substantially constant value, and then allow engine speed to return substantially to the value prior to the controlled increase. The engine speed may be held at the increased value for a prescribed period such as 100 ms, 200 ms, 500 ms or any other suitable time period. Other arrangements are also useful. In some embodiments the entire period during which engine speed is increased to indicate the change in condition of the LSP control system 12 may be a period of 0.5 s, 1 s, 1.5 s, 2 s or any other suitable period.

In the present embodiment the LSP control system 12 is also operable to cause a momentary increase in engine speed when the LSP control 12 transitions from the active condition to the standby condition or the off condition.

In some alternative embodiments the LSP control system 12 may be operable to cause a momentary decrease in engine speed when the LSP control systems 12 transitions from the active condition to the standby or off condition. The momentary decrease may be accompanied in some embodiments by a momentary reduction in an amount of brake torque applied by the braking system 22 if the braking system is applying brake torque at the time the LSP control system 12 transitions from the active condition, in order to compensate for any momentary reduction in net torque at one or more wheels due to the reduction in engine speed. Other arrangements are also useful.

It is to be understood that if the vehicle 100 is being held stationary by the braking system 22 when the LSP control system 12 is activated or transitions from the active condition, it may be unnecessary to issue a request for a change in braking system 12 state such as an increase in brake pressure in the case of a hydraulic braking system 12, since the amount of brake pressure may already be sufficient to continue to hold the vehicle stationary. Other arrangements are also useful.

FIG. 6 illustrates a method of controlling the vehicle 100 of FIG. 1 according to the present embodiment.

At step S101 the vehicle 100 is travelling over terrain with the LSP control system 12 in the off condition. The driver is controlling vehicle speed manually by means of the accelerator and brake pedals 161, 163.

At step S103 the driver activates the LSP control system 12 by pressing the LSP control system selector button 172. The LSP control system 12 initially assumes a standby condition in which the LSP control system 12 awaits a command from a driver to control vehicle speed in accordance with a value of LSP_set-speed.

At step S105 the driver sets the current value of LSP_set-speed to the instant vehicle speed by depressing the 'set' button 173.

At step S107 the LSP control system sets a flag indicating that the LSP control system 12 'active' condition (mode) has been selected.

At step S109 the LSP control system causes a transient increase in engine speed. That is, an increase in engine speed is superimposed on an instant engine speed at the moment the set button 173 is pressed. If the vehicle 100 is moving at the time the transient increase is commanded, the LSP control system 12 commands application of brake torque by the braking system 22 as required substantially to prevent acceleration of the vehicle due to the transient increase.

At step S111, the system 12 checks whether engine speed has returned to the instant engine speed at the moment set button 173 was pressed. If engine speed has so returned, the system 12 continues at step S113 else the system repeats step S111.

At step S113 the LSP control system 12 assumes the active mode and commences causing the vehicle 100 to operate in accordance with the value of LSP_set-speed. The LSP control system 12 manages vehicle speed in accordance with the value of LSP_set-speed by controlling the powertrain 129 and braking system 22 in the manner described above. That is, the control system 12 attempts to cause the vehicle to travel at a speed substantially equal to LSP_set-speed subject to any requirement to reduce speed, for example when it is determined that the prevailing value of LSP_set-speed is inappropriate for the prevailing terrain.

At step S115 the driver depresses brake pedal 163 in order to over-ride the LSP control system 12.

At step S117, in response to driver depression of the brake pedal 163 the LSP control system 12 assumes the standby condition.

Embodiments of the present invention have the advantage that a driver may receive positive confirmation that the LSP control system 12 is in the active condition without being required to divert attention from the terrain ahead of the vehicle whilst driving. This assists in reducing driver workload and may be very helpful when negotiating difficult off-road terrain. Furthermore, because the positive confirmation of activation of the LSP control system 12 is provided by an increase in engine speed, being a component that is controlled by the LSP control system 12 (albeit not directly, but via powertrain controller 11 in the present embodiment), the driver may be reassured that the powertrain 129 is now under the control of the system 12.

It is to be understood that in some embodiments the motor speed blip operation may serve to disguise a change in accelerator pedal response map when transitioning from the active state of the LSP control system 12 to an inactive state. The vehicle 100 may be configured such that a default accelerator pedal response map is employed at least initially, the response map being blended to a map more appropriate to prevailing driving conditions if required. This feature has the advantage that a driver may find vehicle operation more intuitive since the accelerator pedal response is consistent whenever the LSP control system 12 exits the active condition.

It is to be understood that the prevailing driving conditions may for example be determined by reference to a selected terrain response mode.

In some embodiments, when the motor speed blip operation is performed a vibration damping system may be temporarily deactivated, for example an active acoustic/vibration damping or attenuation system. This feature has the advantage that NVH associated with the motor speed blip operation may be enhanced.

In some embodiments, in addition or instead attenuation of engine NVH by means of one or more exhaust baffles may be reduced when the motor speed blip operation is performed in order to provide a more intense indication, more readily perceived by a driver, that the LSP control system is changing activation state.

In some embodiments, if the vehicle 100 is stationary when the LSP control system 12 assumes the active condition, the system 12 may be arranged to cause an increase in torque transmitted from the engine 121 to one or more wheels, for example by varying a driveline clutch pressure and/or varying lockup of a turbine of a transmission. Thus a driver may feel a 'pull' of the powertrain 129 against the braking system 22 to indicate the LSP control system 12 is in the active condition.

In addition to performing the motor speed blip operation the LSP control system 12 may adjust one or more parameters associated with a power assisted steering (PAS) system such as ePAS unit 170C. For example, in some embodiments the system 12 may reduce an amount of steering assistance provided to the driver for a prescribed period of time, optionally a substantially fixed period of suitable length such as 0.5 s. Other arrangements are also useful.

It is to be understood that in some embodiments if the LSP control system 12 determines that one or more wheels of a vehicle 100 are at or near a limit of traction between the wheel and ground, the system 12 may suspend performance of the motor speed blip operation.

In some embodiments, if the powertrain 129 is delivering more than a prescribed amount of torque at the time when the active condition of the LSP control system 12 is selected, the motor speed blip operation is also suspended. In addition or instead the motor speed blip operation is not performed if the engine speed exceeds a prescribed value when the active condition of the LSP control system 12 is selected.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A method of communicating to a user information in respect of a change in activation state of a vehicle speed control system from an inactive state to an active state, the active state being a state in which the speed control system controls vehicle speed in accordance with a target speed at least in part by causing application of positive powertrain drive torque, the inactive state being a state in which the speed control system is not operable to cause application of positive powertrain drive torque, the method comprising:
  causing a transient increase in a speed of a motor or engine of a powertrain to an increased speed to indicate a transition of the vehicle speed control system from the inactive state to the active state to the user;
  substantially preventing an increase in net driving force on a vehicle, thereby preventing unintended acceleration of the vehicle as a consequence of the transient increase in motor or engine speed; and
  after causing the transient increase in the motor or engine speed, and after the motor or engine speed decreases from the increased speed, controlling vehicle speed with the speed control system in accordance with the target speed in the active state.

2. A method according to claim 1 whereby substantially preventing an increase in net driving force on the vehicle as a consequence of the transient increase in motor speed comprises causing a transient increase in brake force applied by a braking system to one or more wheels.

3. A method according to claim 1 comprising causing a transient increase in brake force to induce deceleration of the vehicle, and subsequently causing the transient increase in the speed of a motor of the powertrain prior to controlling vehicle speed in accordance with the target speed in the active state.

4. A method according to claim 1 comprising causing a transient increase in a speed of a motor of the powertrain, subsequently causing a transient increase in brake force to induce deceleration of the vehicle, prior to controlling vehicle speed in accordance with the target speed in the active state.

5. A method according to claim 1, wherein the step of causing a transient increase in a speed of a motor or engine of the powertrain is followed by a step of causing a transient decrease in motor speed prior to the speed control system controlling vehicle speed in accordance with the target speed in the active state.

6. A method according to claim 1 further comprising causing a transient change in motor speed when the speed control system changes from the active state to an inactive state.

7. A method according to claim 1 comprising causing a transient increase in the speed of a motor of the vehicle upon a change in activation state of an off-highway speed control system from an inactive state to an active state.

8. A method according to claim 7 comprising causing a transient increase in a speed of a motor of the vehicle upon a change in activation state of the off-highway speed control system from an inactive state to the active state but not a change in activation state of a cruise control system.

9. A method according to claim 1 comprising causing a vehicle to operate in accordance with the target speed value by controlling an amount of brake torque applied by a braking system and an amount of drive torque applied by a powertrain to one or more wheels of the vehicle.

10. A method according to claim 1 comprising causing the transient increase in speed of a motor only when the vehicle is travelling at a speed below an upper threshold speed.

11. A method according to claim 1 comprising causing the transient increase in speed of a motor only when the vehicle is travelling at a speed above a lower threshold speed.

12. A vehicle controller comprising a non-transitory computer-readable storage medium, the storage medium comprising instructions configured to implement a method of communicating to a user information in respect of a change in activation state of a vehicle speed control system from an inactive state to an active state, the active state being a state in which the speed control system controls vehicle speed in accordance with a target speed at least in part by causing application of positive powertrain drive torque, the inactive state being a state in which the speed control system is not operable to cause application of positive powertrain drive torque, the method comprising:
  causing a transient increase in a speed of a motor or engine of a powertrain to an increased speed to indicate a transition of the vehicle speed control system from the inactive state to the active state to the user;
  substantially preventing an increase in net driving force on a vehicle, thereby preventing unintended acceleration of the vehicle as a consequence of the transient increase in motor or engine speed; and
  after causing the transient increase in the motor or engine speed, and after the motor or engine speed decreases from the increased speed, controlling vehicle speed with the speed control system in accordance with the target speed in the active state.

13. A vehicle control system, comprising:
a speed control system; and
a vehicle controller operable to communicate to a user of a vehicle information in respect of a change in activation state of the speed control system from an inactive state to an active state, the active state being a state in which the speed control system controls vehicle speed in accordance with a target speed at least in part by causing application of positive powertrain drive torque, the inactive state being a state in which the speed control system is unable to cause application of positive powertrain drive torque, the controller being operable to communicate the change by: (a) causing a transient increase in a speed of a motor of a powertrain to an increased speed, and substantially preventing an increase in net driving force on a vehicle such that unintended acceleration of the vehicle as a consequence of the transient increase in motor or engine speed is prevented, and (b) after the transient increase in motor or engine speed, allowing the motor or engine speed to decrease from the increased speed;
  the speed control system controlling vehicle speed in accordance with the target speed in the active state after the motor or engine speed decreases from the increased speed.

14. A vehicle control system according to claim 13 arranged to control the vehicle substantially to prevent an increase in net driving force on a vehicle as a consequence of the transient increase in motor speed.

15. A vehicle control system according to claim 13 operable to cause a transient increase in a speed of a motor of the vehicle upon a change in activation state of a vehicle speed control system, wherein when the speed control system is active the speed control system causes the vehicle to operate in accordance with the target speed value by controlling an amount of brake torque applied by a braking system and an amount of drive torque applied by the powertrain to one or more wheels of the vehicle.

16. A vehicle control system according to claim 13 wherein the speed control system is operable to assume first and second respective inactive states, wherein in the first inactive state the speed control system does not control vehicle speed and in the second inactive state the speed control system controls vehicle speed in accordance with the target speed by application of brake force and not by application of positive powertrain drive torque.

17. A vehicle control system according to claim 15 wherein the vehicle controller is included in the speed control system.

18. A vehicle comprising a vehicle control system according to claim 12.

19. A method according to claim 1, wherein the transient increase in the motor or engine speed is initiated from an instant engine speed of the motor or engine; and
  wherein the vehicle speed is controlled in the active state after the motor or engine speed decreases to the instant engine speed.

20. A vehicle control system according to claim 13, wherein the transient increase in the motor or engine speed is initiated from an instant engine speed of the motor or engine, the speed control system controlling vehicle speed in the active state after the motor or engine speed decreases to the instant engine speed.

* * * * *